US006922245B2

United States Patent
Jung et al.

(10) Patent No.: US 6,922,245 B2
(45) Date of Patent: Jul. 26, 2005

(54) OPTICAL ALIGNMENT APPARATUS AND METHOD USING VISUAL OPTICAL SOURCE AND IMAGE

(75) Inventors: Joon Young Jung, Gwangju (KR); Hyung Suk Ryu, Gyeonggi-Do (KR); Hyun Seo Kang, Gwangju (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 10/696,896

(22) Filed: Oct. 29, 2003

(65) Prior Publication Data

US 2004/0169860 A1 Sep. 2, 2004

(30) Foreign Application Priority Data

Feb. 27, 2003 (KR) ................................ 10-2003-0012444

(51) Int. Cl.[7] .............................................. G01B 11/00
(52) U.S. Cl. ...................................................... 356/399
(58) Field of Search ................................ 356/399–401, 356/73.1, 124.5; 385/24, 52, 9–17, 25–33, 14, 15, 90, 91; 250/214 R, 227.18, 227.23, 227.24, 227.11, 216

(56) References Cited

U.S. PATENT DOCUMENTS

| | | | | |
|---|---|---|---|---|
| 4,626,683 A | | 12/1986 | Van Zeeland | |
| 5,838,450 A | * | 11/1998 | McCoy et al. | 356/401 |
| 5,926,594 A | * | 7/1999 | Song et al. | 385/49 |
| 6,041,071 A | * | 3/2000 | Tayebati | 372/64 |
| 6,118,131 A | | 9/2000 | Korevaar | |
| 6,441,895 B1 | | 8/2002 | Kogan et al. | |
| 6,504,611 B2 | * | 1/2003 | Kogan et al. | 356/399 |
| 6,690,865 B2 | * | 2/2004 | Miyazaki | 385/52 |

* cited by examiner

Primary Examiner—Zandra V. Smith
Assistant Examiner—Gordon J. Stock, Jr.
(74) Attorney, Agent, or Firm—Blakely Sokoloff Taylor & Zafman

(57) ABSTRACT

Provided is an optical alignment apparatus and method that can enhance the efficiency of optical alignment by using a light source for generating light of a visible wavelength range and lensed fiber and perform optical alignment quickly, precisely and economically. The optical alignment apparatus of the present research includes: a first light source for providing light of a visible wavelength range to perform optical alignment; a second light source providing light of an infrared wavelength range; a micrometer stage for aligning the light outputted from the first light source or the second light source with an active area of a detector; lensed fiber for inputting light into the active area of the detector; an optical alignment confirming means for visually confirming whether the light outputted from the lensed fiber is aligned with the active area of the detector; an image information acquiring means for acquiring image information; and a control means for operating the micrometer stage.

3 Claims, 2 Drawing Sheets

OPTICAL ALIGNMENT APPARATUS AND METHOD USING VISUAL OPTICAL SOURCE AND IMAGE

FIELD OF THE INVENTION

The present invention relates to an optical alignment apparatus and method for aligning light of an infrared wavelength range which is used for an optical communication quickly, precisely and economically by using images and a light source generating light of a visible wavelength range; and, more particularly, to an optical alignment apparatus and method that uses the visible light source for optical alignment and enhances the efficiency of optical alignment by using lensed fiber, checks whether the inputted light is aligned with a detector by using a microscope and a charge coupled device (CCD), performs optical alignment between the inputted light and the detector by using a control circuit connected to the CCD and moving an X, Y, Z, Tilt micrometer stage, and then performs optical alignment between the light that has an infrared wavelength and the detector by inputting the light that has an infrared wavelength.

DESCRIPTION OF RELATED ART

One of optical alignment methods performs optical alignment by using the optical intensity of inputted light. To describe it in detail, optical alignment is performed by inputting light having a predetermined optical intensity to an active area of a detector, and detecting a point where the optical intensity of the inputted light is measured to be the maximum in the detector. However, this method that uses the optical intensity can hardly confirm whether optical alignment is performed exactly. Moreover, it is hard to manually detect the point where the optical intensity is the maximum. In case where optical alignment is performed automatically, it takes a little time and an expensive instrument is needed to measure the optical intensity.

Another optical alignment method utilizes a light emitting diode (LED) and a CCD camera. This method will be described below with reference to FIG. 1.

FIG. 1 is a diagram describing the prior optical alignment method. In this method, light outputted from the LED 110 meets an active area 140 of the detector 130 and is reflected.

The reflected light goes to a reflector 170 through a beam splitter 150, and the light reflected from the reflector 170 enters a CCD camera 180. Through these processes, an optical system 120 is aligned with the active area 140 of the detector 130. First, the optical system 120 and the active area 140 of the detector 130 are aligned by using images of the optical system 120 and the active area 140 of the detector 130 and then light 190 is inputted. The light 190 is transmitted to the detector 130 through the optical system 120, and the light reflected from the detector 130 is transmitted to the CCD camera 180 through a beam splitter 150 and the reflector 170. From the CCD camera 180, it can be known on what part of the detector 130 the inputted light 190 is focused. Also, the inputted light 190 can be brought into a focus in the active area 140 of the detector 130 by moving the optical system 120 based on the difference between focus of previous alignment by LED 110 and focus of the light 190. In this method, the Z axis and tilt are out of consideration, and the optical system 120 and the active area 140 are aligned with respect to the X and Y axes. In order for the inputted light to be seen in the CCD camera 180, the inputted light should be in the range of visible wavelength. Therefore, this method cannot be used for communication. To be used for communication, the above method requires an expensive infrared camera.

As described above, the conventional methods have advantages and disadvantages of their own, and a new technology needs to be developed to solve the problems of the conventional technologies and perform optical alignment quickly, precisely and economically.

SUMMARY OF THE INVENTION

It is, therefore, an object of the present invention to provide an optical alignment apparatus and method that can enhance the efficiency of optical alignment by using a light source which generates light of a visible wavelength range and a lensed fiber, and perform optical alignment quickly, precisely and economically.

In accordance with an aspect of the present invention, there is provided an optical alignment apparatus using visible light and images, including: a first light source for providing light of a visible wavelength range to perform optical alignment; a second light source providing light of an infrared wavelength range; a micrometer stage for aligning the light outputted from the first light source or the second light source with an active area of a detector; a lensed fiber connected to the micrometer stage, for inputting the light outputted from the first light source or the second light source into the active area of the detector; an optical alignment confirming unit for visually confirming whether the light outputted from the lensed fiber is aligned with the active area of the detector; an image information acquiring unit connected to the optical alignment confirming unit, for acquiring image information; and a control unit for operating the micrometer stage by using the image information acquired by the image information acquiring unit to perform optical alignment.

In accordance with another aspect of the present invention, there is provided an optical alignment apparatus including: an optical coupler for connecting the first light source and the second light source simultaneously and outputting inputted light in a predetermined proportion; a compensation unit for compensating a difference in distances to a beam waist, the difference being generated by different wavelengths of the first light source and the second light source; and an optical intensity supervising unit for controlling optical intensity of light inputted to an active area of a detector by connecting the optical intensity supervising unit with an output port of the optical coupler which is not coupled with the detector.

In accordance with another aspect of the present invention, there is provided an optical alignment method using visible light and images, comprising the steps of: a) aligning the light outputted from a light source with an active area of a detector; b) inputting the light outputted from the light source into the active area of the detector through an optical coupler and lensed fiber; c) visually confirming on what part of the active area of the detector the light transmitted through the lensed fiber is focused by using a microscope, and providing image information, which shows an extent of optical alignment and is provided by a charge coupled device connected to the microscope, to a control circuit unit; d) controlling the micrometer stage to perform optical alignment by using the image information provided by the charge coupled device in the control circuit unit; and e) performing optical alignment between the lensed fiber and the active area of the detector by operating the micrometer stage under the control of the control circuit unit.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
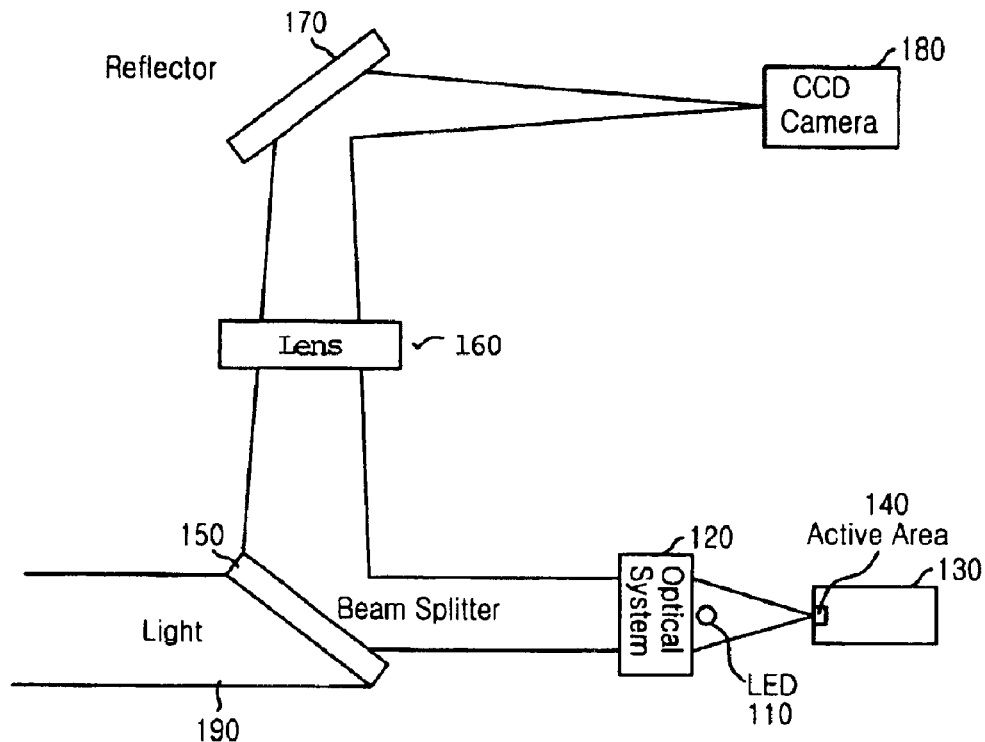
FIG. 1 is a diagram describing a prior optical alignment method.
Figure 2:
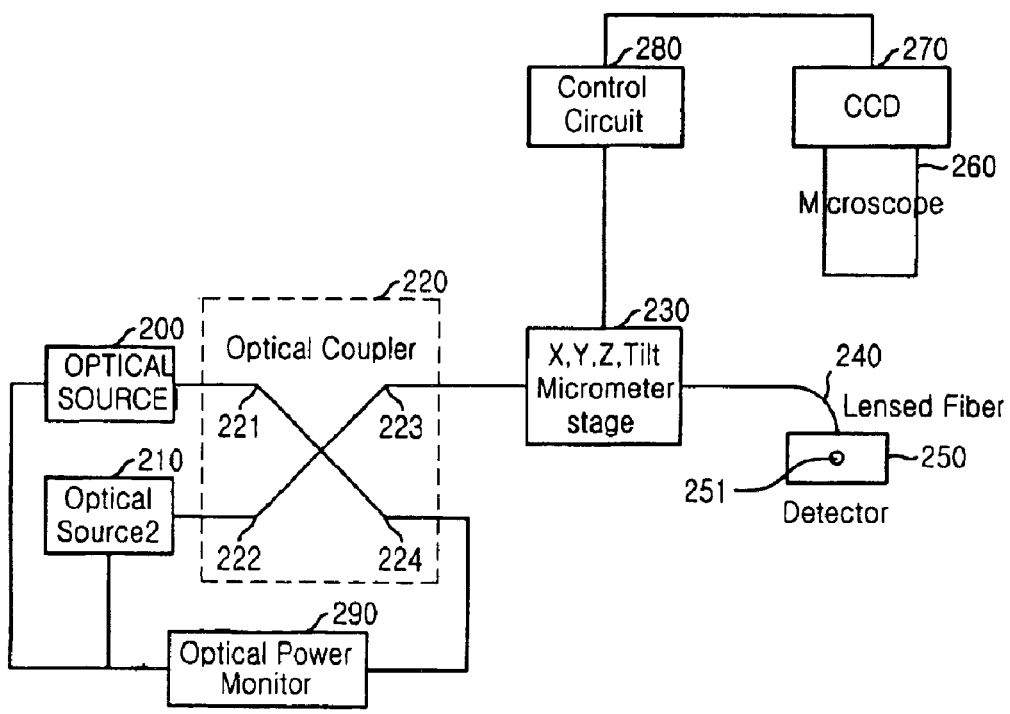
FIG. 2 is a block diagram illustrating an optical alignment apparatus using a visible optical source and images in accordance with a preferred embodiment of the present invention.
Figure 3A:
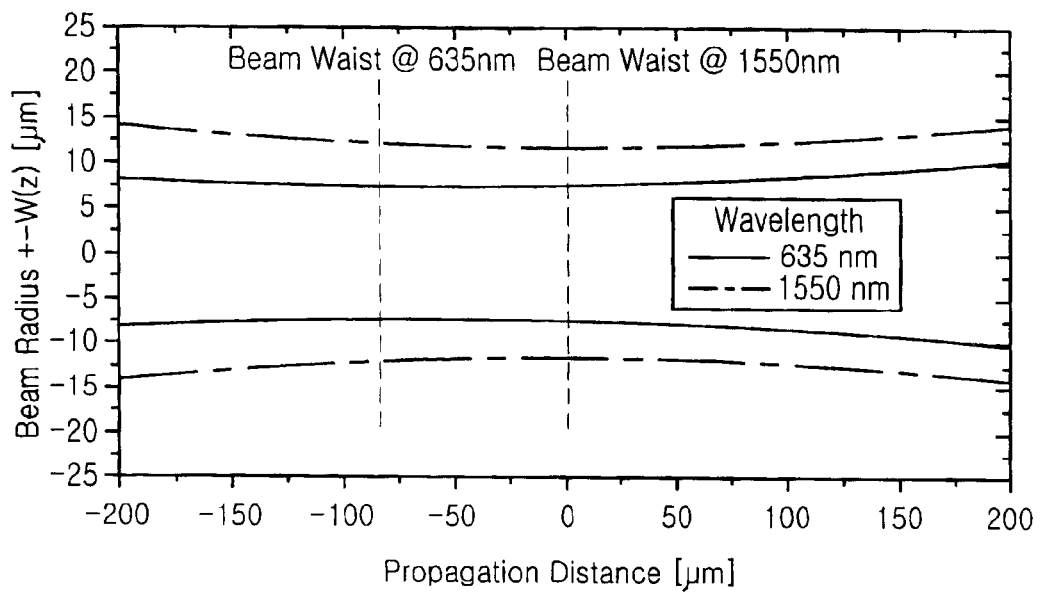
FIGS. 3A and 3B are graphs illustrating the size of beam waist in accordance with a preferred embodiment of the present invention.
Figure 3B:
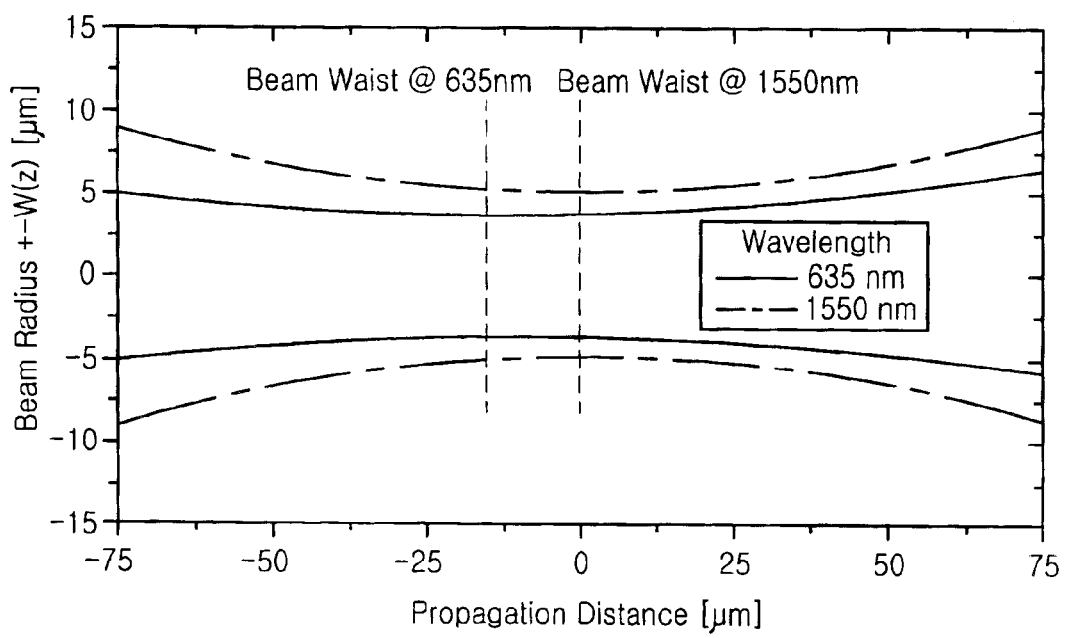

FIG. 2 is a block diagram illustrating an optical alignment apparatus using a visible optical source and images in accordance with a preferred embodiment of the present invention. FIGS. 3A and 3B are graphs illustrating the size of beam waist in accordance with a preferred embodiment of the present invention.

Referring to FIG. 2, the optical alignment apparatus of the present invention includes: a first light source 200 for generating light of a visible wavelength range and used for optical alignment; a second light source 210 for generating light of an infrared wavelength range and used for optical communication; an optical coupler 220 for connecting the first light source 200 and the second light source 210 simultaneously and supervising optical alignment and optical intensity simultaneously; a first input port 221 of the optical coupler 220; a second input port 222 of the optical coupler 220; a first output port 223 of the optical coupler 220; a second output port 224 of the optical coupler 220; a lensed fiber 240 for collecting the light from the first output port 223 of the optical coupler 220 in an active area 251 of a detector 250; an X, Y, Z, Tilt micrometer stage 230 for aligning the lensed fiber 240 with the active area 251 of the detector 250; the detector 250 which is aligned with the light outputted from the first light source 200 or the second light source 210; a microscope 260 for visually confirming whether the light outputted from the first light source 200 is aligned with the active area 251 of the detector 250; a charge coupled device (CCD) 270 for performing optical alignment by using images seen in the microscope 260; a control circuit unit 280 for aligning the light outputted from the first light source 200 with the active area 251 of the detector 250 by using the image seen in the CCD 270 and moving the X, Y, Z, Tilt micrometer stage 230; and an optical intensity supervising unit 290 for maintaining the intensity of light at a predetermined level.

The light outputted from the first light source 200 or the second light source 210 is inputted to the first input port 221 or the second input port 222 of the optical coupler 220 and outputted through the first and second output ports 223 and 224 simultaneously. The optical intensity supervising unit 290 connects the first or second light source 200 or 210 and the second output port 224 to maintain the intensity of light from the first output port 223 at a predetermined level.

Hereinafter, the optical alignment apparatus of the present invention having the above described elements will be described more in detail. The light outputted from the first light source 200 of the visible wavelength range is aligned with the active area 251 of the detector 250. The light outputted from the first light source 200 is inputted into the active area 251 of the detector 250 through the optical coupler 220 and the lensed fiber 240.

Since the light from the first light source 200 is in the range of visible wavelengths, it can be confirmed visually on what part of the active area 251 of the detector 250 the light transmitted through the lensed fiber 240 is focused. The CCD 270 connected to the microscope 260 provides image information which reveals the extent of optical alignment to the control circuit unit 280. The control circuit unit 280 controls the X, Y, Z, Tilt micrometer stage 230 to perform optical alignment by using the image information transmitted from the CCD 270.

The X, Y, Z, Tilt micrometer stage 230 performs optical alignment between the lensed fiber 240 and the active area 251 of the detector 250 under the control of the control circuit unit 280. The light outputted from the first light source 200 is aligned with the active area 251 of the detector 250 precisely by repeating the above processes.

After the optical alignment between the lensed fiber 240 and the active area 251 of the detector 250, the first light source 200 is turned off, and the second light source 210 which provides light of the infrared wavelength range is turned on. The wavelengths of the light from the first light source 200 and the light from the second light source 210 are different. So, there is a difference in a distance from a lensed fiber 240 to a beam waist between the first light source 200 and the second light source 210.

The difference in the distance from a lensed fiber 240 to the beam waist, which is caused by the difference in the wavelengths of the light transmitted from the first and second light sources may be compensated or not compensated. Whether to compensate or not is determined based on the size of the active area 251 of the detector 250 and the kind of the lensed fiber 240. If it needs to be compensated, the Z axis is moved as much as needed by using the X, Y, Z, Tilt micrometer stage 230

For example, when the first and second light sources 200 and 210 generate light of 635 nm and 1550 nm, respectively, and the size of the active area 251 of the detector 250 is 30 um, whether to compensate for the difference in the distances to the beam waist is determined as follows.

Let's define that T is the lens thickness of the lensed fiber 240 and Rc is the curvature radius of the lensed fiber 240. First, when a T value and an Rc value of the lensed fiber are 400 um and 92 um, respectively, the distance from the lensed fiber 240 to the beam waist of the first light source 200 is 380 um and the distance from the lensed fiber 240 to the beam waist of the second light source 210 is 450 um. Here, the distance difference between the first and second light sources 200 and 210 is 70 um. In FIG. 3A, the size of the beam waist of the second light source 210 is 22.8 um and the size of the waist at a location 70 um away from the beam waist position is around 25 um. Since the size of the active area 251 of the detector 250 is 30 um, no compensation needs to be made on the Z axis.

Secondly, when the T value and Rc value of the lensed fiber 240 are 520 um and 78 um, respectively and the distance from the lensed fiber 240 to the beam waist of the first light source 200 is 286 um and the distance from the lensed fiber 240 to the beam waist of the second light source 210 is 300 um. Here, the distance difference between the first and second light sources 200 and 210 is 14 um. In FIG. 3B, the size of the beam waist of the second light source 210 is 10 um and the size of the waist at a location 14 um away from the beam waist position is about 13 um. Since the size of the active area 251 of the detector 250 is 30 um, no compensation needs to be made on the Z axis. If the kind of lensed fiber 240 is proper to the size of the active area of the detector, the difference in the distances to the beam waist, which is generated due to the difference in the wavelengths of the light generated by the light sources, needs not be compensated.

The light outputted from the first light source 200 or the second light source 210 is transmitted to the first output port 223 and the second output port 224 of the optical coupler 220 in a predetermined proportion. If the optical intensity of the light transmitted to the first output port 223 needs to be maintained at a predetermined level, the optical intensity of the light outputted from the first or second light source 200 or 210 is controlled by supervising the optical intensity of the light transmitted to the second output port 224.

In the present invention, the light outputted from a light source can be aligned with the active area of the detector by using the light of the visible wavelength range. As described before, many methods for aligning the light outputted from a light source with the active area of the detector are disclosed in the prior researches. One of the commercialized methods is a structure that performs optical alignment by measuring the optical intensity of the light outputted from a light source.

The technology of the present invention, however, is very economical because it does not require special equipment for measuring the optical intensity of inputted light owing to the use of the visible light source. Since it uses images to perform optical alignment between the light and the active area of the detector, it can perform the optical alignment quickly. Also, when the kind of lensed fiber is proper to the size of the active area of the detector, the optical alignment can be performed precisely even without compensation for the difference in the distances to the beam waist, which occurs due to the use of different light sources. In addition, the optical intensity of the light inputted to the active area of the detector can be controlled at a predetermined level by using the optical coupler and an optical intensity supervising unit.

In accordance with the present invention, the optical alignment can be performed quickly, precisely and economically by using the visible light source and images to determine whether the light outputted from the visible light source is aligned with the active area of the detector. Therefore, the cost for performing optical alignment can be reduced and an optical alignment apparatus that can perform optical alignment at an inexpensive cost can be fabricated.

While the present invention has been described with respect to certain preferred embodiments, it will be apparent to those skilled in the art that various changes and modifications may be made without departing from the scope of the invention as defined in the following claims.

What is claimed is:

1. An optical alignment apparatus using visible light source and images, comprising:

a first light source for providing light of a visible wavelength range to perform optical alignment;

a second light source providing light of an infrared wavelength range;

a micrometer stage for aligning the light outputted from the first light source or the second light source with an active area of a detector;

a lensed fiber connected to the micrometer stage, for inputting light into the active area of the detector;

an optical alignment confirming means for visually confirming whether the light outputted from the lensed fiber is aligned with the active area of the detector;

an image information acquiring means connected to the optical alignment confirming means, for acquiring image information;

a control means for operating the micrometer stage based on the image information acquired by the image information acquiring means to perform optical alignment;

an optical coupler for connecting the first light source and the second light source simultaneously and outputting light to a first output port and a second output port of the optical coupler in a predetermined proportion; and an optical intensity supervising means for controlling optical intensity of light inputted to the active area of the detector by being connected with the optical coupler's output port which is not connected with the detector;

wherein the control means includes the micrometer stage to compensate a difference in distances to a beam waist, the difference being generated by different wavelengths of the first light source and the second light source.

2. The optical alignment apparatus as recited in claim 1, wherein the optical coupler includes a first input port and a second input port.

3. The optical alignment apparatus as recited in claim 1, wherein the detector performs optical alignment with the light outputted from the first light source or the second light source.

* * * * *